United States Patent Office 3,360,950
Patented Jan. 2, 1968

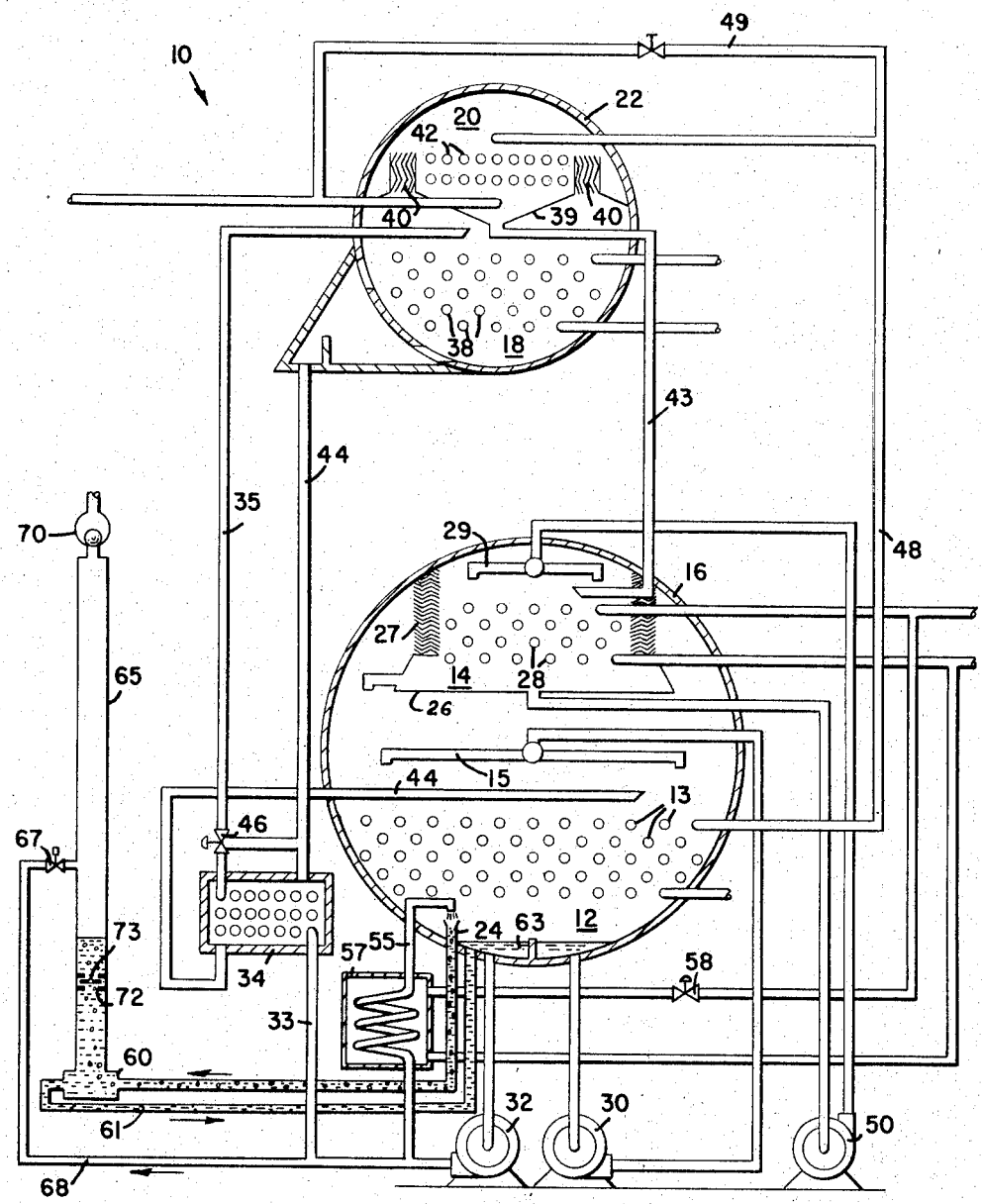

3,360,950
PURGE ARRANGEMENT FOR ABSORPTION REFRIGERATION SYSTEMS
William T. Osborne, East Syracuse, N.Y., assignor to Carrier Corporation, Syracuse, N.Y., a corporation of Delaware
Filed Nov. 30, 1965, Ser. No. 510,595
3 Claims. (Cl. 62—85)

ABSTRACT OF THE DISCLOSURE

Purge mechanism for an absorption refrigeration system where a falling stream of solution is discharged through the system absorber into an open end of the purge tube, the solution stream serving to draw into entrainment therewith noncondensible gases in the absorber. The noncondensible gases are later separated from the entraining solution and discharged to the atmosphere.

This invention relates to absorption refrigeration systems and, more particularly, to an improved purge arrangement and method for removing relatively noncondensible gases from absorption refrigeration systems.

The presence of relatively noncondensible gases within an absorption refrigeration system impairs the efficiency of the system. Of the system components, the absorber section, within which pressures are lower than in all other vessels in the system and substantially below atmospheric pressure, is particularly prone to accumulate noncondensible gases. A principal source of these relatively noncondensible gases comprises air leaking through joints and welds of the absorber section shell into the absorber section. Additionally, oxygen in the air leaking into the system will corrode copper and steel parts of the system components to liberate other relatively noncondensible gases.

It is a principal object of the present invention to provide an improved purging arrangement for removing relatively noncondensible gases from an absorption refrigeration system.

It is an object of the present invention to provide a method for purging relatively noncondensible gases from an absorption refrigeration system.

It is a further object of the present invention to provide a purge arrangement for absorption refrigeration systems wherein a falling stream of liquid serves to attract and entrap noncondensible gases within a purge line.

It is a further object of the present invention to provide a purge mechanism for absorption refrigeration systems in which a part of the solution discharging from the system solution pump is directed into a purge line to carry noncondensible gases from the system.

This invention relates to an absorption refrigeration system comprising in combination a generator section; a condenser section; an evaporator section; an absorber section; the absorber section including a sump within which relatively weak solution is adapted to collect; a purge line leading from the absorber section; pump means for passing solution in the absorber section to the generator section, the pump means including a suction line opening into the absorber section sump; a conduit leading from the discharge side of the pump means to the purge line to divert a portion of the solution discharging from the pump means to the purge line, the conduit opening into the purge line to emit a stream of solution into the purge line which draws noncondensible gases from the absorber section into the purge line and into entrainment with the solution stream; and means connected to the purge line for separating noncondensible gases from the entraining solution to permit return of solution to the absorber section and rejection of the noncondensible gases to the atmosphere.

This invention relates to a method of removing noncondensible gases from an absorption refrigeration system of the type which includes a generator section; a condenser section; an evaporator section and an absorber section, with pump means for passing solution in the absorber section to the generator section, and a purge line opening into the absorber section, in which the steps consist in diverting a part of the solution discharging from the pump means into the purge line; discharging the diverted solution as a stream into the purge line to draw noncondensible gases from the absorber section through the purge line and into entrainment with the solution stream; separating noncondesible gases from the entraining solution; returning separated solution to the absorber section; and expelling separated noncondensible gases to the atmosphere.

Other objects and advantages will be apparent from the ensuing specification and drawings in which the figure is a diagrammatic view partially in cross section of an absorption refrigeration machine incorporating the purge arrangement of the present invention.

Referring to the drawing, there is shown an absorption refrigeration machine 10 comprising absorber section 12 and evaporator section 14 housed within shell 16 and generator section 18 and condenser section 20 housed within shell 22. Purge line 24, which opens into a suitable region of absorber section 12, preferably slightly below heat exchanger tubes 13, is adapted to conduct noncondensible gases therefrom as will be more apparent hereinafter. Spray header 15 is disposed above heat exchanger tubes 13.

Pan-like member 26 delineates evaporator section 14. Eliminators 27 prevent entrained liquid refrigerant particles in evaporator section 14 from being carried into absorber section 12. Fluid medium to be conditioned is passed through heat exchanger tubes 28 in evaporator section 14. Spray header 29 distributes refrigerant over tubes 28.

In operation, refrigerant sprayed over tubes 28 in evaporator section 14 is vaporized, cooling the fluid medium passing through tubes 28. The vaporized refrigerant, carrying with it the heat extracted from the fluid medium, passes through eliminators 27 into absorber section 12 wherein the refrigerant vapor is absorbed by absorbent discharged over tubes 13 by spray header 15. Suitable cooling fluid passing through heat exchanger tubes 13 absorbs the heat carried with the refrigerant vapor and the heat liberated by the chemical dilution of the absorbent.

Solution recirculation pump 30 circulates absorbent solution of intermediate strength from one part of the absorber section sump to spray header 15. Solution pump 32 withdraws weak solution from absorber section sump portion 63 which is passed through line 33, solution heat exchanger 34, and line 35 to generator section 18.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution.

A suitable absorbent for a refrigeration system of the type described comprises a hygroscopic aqueous salt solution such as lithium bromide and water, and a suitable refrigerant is water. The concentration of the strong solution leaving the generator may be about 65%.

The absorption of refrigerant vapor by absorbent solution in absorber section 12 dilutes the absorbent solution, reducing its absorptive power, and diminishes the refrigerant supply which must be replenished in order to maintain the refrigeration machine in operation. It is desirable, therefore, to concentrate the weak solution by separating it from the absorbed refrigerant and to return the refrigerant to the evaporator section and the concentrated absorbent solution to the absorber section. For this purpose, a generator section 18 and a condenser section 20 are provided.

Generator section 18 includes heat exchanger tubes 38 for placing steam or other heating fluid in heat exchange relation with solution in the generator. Pan-like member 39 delimits condenser section 20 from generator section 18. Eliminators 40 prevent strong solution from being entrained with refrigerant vapor passing from generator section 18 to condenser section 20. A suitable cooling medium is passed through heat exchanger tubes 42 in condenser section 20.

Line 43 serves to return condensed refrigerant from condenser section 20 to evaporator section 14 while line 44 serves to return relatively hot strong solution from generator section 18 to absorber section 12. Solution heat exchanger 34 brings the relatively hot strong solution into heat exchange relation with relatively cool weak solution being forwarded to generator section 12 for concentration thereof.

Bypass valve 46, adapted to be actuated in response to system load conditions by suitable means (not shown), is provided to control system capacity. Cooling fluid, such as water, passed through heat exchanger tubes 13 in absorber section 12, may be thereafter conducted by line 48 to heat exchanger tubes 42 in condenser section 20. Bypass line 49 may be provided to pass the cooling water around condenser section 20 where desired. Recirculating pump 50 passes refrigerant drawn from evaporator section 14 to spray header 29 thereof.

As is understood by those skilled in the art, relatively noncondensible gases within the system tend to accumulate adjacent the lower portions of the absorber section heat exchanger tubes 13. Purge line 24 opens into this area.

Solution bypass line 55, which opens above and substantially opposite purge line 24, connects to the discharge side of solution pump 32. The dimension of bypass line 55 is such that the stream of liquid solution falling therefrom into purge line 24 substantially covers the opening presented by purge line 24 so that escape of noncondensible gases drawn into purge line 24 with the solution stream is prevented.

Preferably, the solution in line 55 is cooled, as by heat exchanger 57, to reduce solution vapor pressures and enhance the effectiveness of the falling stream of solution to attract and remove noncondensible gases from absorber section 12. A portion of the heat exchange medium from evaporator section heat exchanger tubes 28 may be directed through control valve 58 to heat exchanger 57 to cool solution in line 55. Other sources of cooling medium, for example, cooling tower water may be contemplated.

Purge line 24 communicates with separator 60. Separator 60 permits the noncondensible gases to rise from the entraining solution, the solution thereafter returning through line 61 to the absorber section sump 63. The separated noncondensible gases accumulate in storage chamber 65. Following an accumulation of noncondensible gas in storage chamber 65, valve 67 is opened and solution from solution pump 32 is discharged from line 68 into chamber 65. As storage chamber 65 fills with solution, the pressure of noncondensible gases therewithin increases. At a determined pressure relief valve 70 opens permitting the egress of the noncondensible gases into the atmosphere.

Check valve 72 in storage chamber 65 permits flow of noncondensible gases from separator 60 into the upper part of storage chamber 65. Check valve 72 includes an orifice 73 permitting solution in storage chamber 65 to bleed into separator 60 and through line 61 to the absorber section sump 63. By this arrangement, the pressure build-up necessary to discharge the noncondensible gases from chamber 65 into the atmosphere is effected and trapping of solution in chamber 60 at closure of valve 67 following purging of the noncondensible gases from storage chamber 65 is obviated.

While the discharge end of solution bypass line 55 is illustrated within shell 16, it is understood that line 55 may be arranged to discharge solution into purge line 24 at any convenient point along the vertical extent of purge line 24 either within or without shell 16.

While I have described a preferred embodiment of this invention, it will be understood that the invention is not limited thereto since it may be otherwise embodied within the scope of the following claims.

I claim:

1. The method of removing noncondensible gases from an absorption refrigeration system of the type which includes a generator section, a condenser section, an evaporator section and an absorber section, with pump means for passing solution in said absorber section to said generator section, and a purge line opening into said absorber section, the steps which consist in diverting a part of the solution discharging from said pump means into said purge line; discharging said diverted solution as a stream through said absorber section and into the open end of said purge line to draw noncondensible gases from said absorber section through said purge line and into entrainment with said solution stream; separating noncondensible gases from said entraining solution; returning separated solution to said absorber section; expelling separated noncondensible gases to the atmosphere; and reducing vapor pressures of said diverted solution stream prior to discharge of said solution stream into said purge line.

2. In an absorption refrigeration system of the type having a generator section, a condenser section, an evaporator section and an absorber section, said absorber section including a sump within which relatively weak solution is adapted to collect, the combination of a purge line leading from said absorber section, the terminal end of said purge line being in open communication with said absorber section; pump means for passing solution in said absorber section to said generator section, said pump means including a suction line opening into said absorber section sump; a conduit leading from the discharge side of said pump means to a point substantially opposite to and spaced from said purge line open terminal end, said conduit being adapted to divert a portion of the solution discharging from said pump means into said purge line open terminal end, the stream of solution emitted from said conduit and passing through said absorber section in the space between said conduit and said purge line open terminal end being adapted to draw noncondensible gases from said absorber section into said purge line and into entrainment with said solution stream; means connected to said purge line for separating noncondensible gases from said entraining solution to permit return of solution to said absorber section and rejection of said noncondensible gases to the atmosphere; and means for reducing the vapor pressure of said solution stream.

3. In an absorption refrigeration system of the type having a generator section, a condenser section, an evaporator section and an absorber section, said absorber section including a sump within which relatively weak solution is adapted to collect, the combination of a purge line leading from said absorber section, the terminal end of said purge line being in open communication with said absorber section; pump means for passing solution in said absorber section to said generator section, said pump means including a suction line opening into said absorber section sump; a conduit leading from the discharge side of said pump means to a point substantially opposite to and spaced from said purge line open terminal end, said conduit being adapted to divert a portion of the solution discharging from said pump means into said purge line open terminal end, the stream of solution emitted from said conduit and passing through said absorber section in the space between said conduit and said purge line open terminal end being adapted to draw noncondensible gases from said absorber section into said purge line and into entrainment with said solution stream, said conduit opening above said purge line open terminal end, the dimension of said conduit being such that the stream of solution emitted therefrom substantially fills said purge line to seal said purge line and prevent escape of noncondensible gases from said purge line into said absorber section; and means connected to said purge line for separating noncondensible gases from said entraining solution to permit return of solution to said absorber section and rejection of said noncondensible gases to the atmosphere.

References Cited

UNITED STATES PATENTS 2,522,410  9/1950  Thomas  62—195

LLOYD L. KING, *Primary Examiner.*